(12) United States Patent
Bommer et al.

(10) Patent No.: US 8,040,243 B2
(45) Date of Patent: Oct. 18, 2011

(54) RFID-BASED CORROSION AND MOISTURE DETECTION

(75) Inventors: Jason P. Bommer, Tacoma, WA (US); Gerardo Pena, Seattle, WA (US); Matthew C. Malkin, Seattle, WA (US)

(73) Assignee: The Boeing Company, Chicago, IL (US)

( * ) Notice: Subject to any disclaimer, the term of this patent is extended or adjusted under 35 U.S.C. 154(b) by 276 days.

(21) Appl. No.: 12/273,014

(22) Filed: Nov. 18, 2008

(65) Prior Publication Data

US 2010/0123583 A1    May 20, 2010

(51) Int. Cl.
    *G08B 13/14* (2006.01)
(52) U.S. Cl. ............... 340/572.7; 340/572.5; 340/572.8; 340/10.41; 340/870.07; 340/870.16; 340/541; 340/545.1; 340/657; 73/767; 73/768; 73/799; 73/802; 73/851
(58) Field of Classification Search ............... 340/572.7, 340/572.5, 572.8, 10.41, 870.07, 870.16, 340/541, 545.1, 657; 73/767, 768, 799, 802, 73/851
See application file for complete search history.

(56) References Cited

U.S. PATENT DOCUMENTS

| 7,231,826 | B2 | 6/2007 | Bossi et al. | |
| 7,333,898 | B2 | 2/2008 | Griess et al. | |
| 7,434,480 | B2 | 10/2008 | Georgeson et al. | |
| 7,621,193 | B2 * | 11/2009 | Fay et al. | 73/865.9 |
| 2005/0012616 | A1 * | 1/2005 | Forster et al. | 340/572.7 |
| 2007/0125189 | A1 | 6/2007 | Bossi et al. | |
| 2008/0109187 | A1 | 5/2008 | Kollgaard et al. | |
| 2008/0163670 | A1 | 7/2008 | Georgeson | |
| 2008/0167833 | A1 | 7/2008 | Matsen et al. | |
| 2008/0223152 | A1 | 9/2008 | Georgeson et al. | |
| 2010/0154484 | A1 * | 6/2010 | Skoric et al. | 68/13 R |

OTHER PUBLICATIONS

Greene, "Sensors Without Batteries," http://www.technologyreview.com/read_article.aspx?id=16864&ch=infotech&a=f, Technology Review Published by MIT, May 15, 2006.
Eckfeldt, "What Does RFID Do for the Consumer?," Comm. of the ACM, Sep. 2005, vol. 48, No. 9, pp. 77-79.
Gunther et al., "RFID and the Perception of Control: The Consumer's View," Comm. of the ACM, Sep. 2005, vol. 48, No. 9, pp. 73-76.
Ohkubo et al., "RFID Privacy Issues and Technical Challenges," Comm. of the ACM, Sep. 2005, vol. 48, No. 9, pp. 66-71.

(Continued)

*Primary Examiner* — Tai T Nguyen
(74) *Attorney, Agent, or Firm* — Canady & Lortz LLP; Bradley K. Lortz

(57) ABSTRACT

Structural health monitoring apparatuses and methods are disclosed. One or more structural health sensors may be used to disconnect and/or connect one or more RFID chips to an antenna such that wireless communication with the one or more RFID chips (or the absence of wireless communication) through the antenna indicates the structural health status. Example structural health sensors may be moisture detecting or fracture detecting. A remote reader may be used to establish the wireless communication with the one or more RFID chips to determine the structural health. The sensors and RFID chips may be passive and powered through the wireless communication from the remote reader. Such apparatuses and methods may be applied to any large structures requiring regular inspection, such as aircraft, ships, automobiles or buildings.

16 Claims, 7 Drawing Sheets

OTHER PUBLICATIONS

Hsi et al., "RFID Enhances Visitors' Museum Experience at the Exploratorium," Sep. 2005, vol. 48, No. 9, pp. 60-65.

Pering et al., "Spontaneous Marriages of Mobile Devices and Interactive Spaces," Sep. 2005, vol. 48, No. 9, pp. 53-59.

Sample et al., "Design of an RFID-Based Battery-Free Programmable Sensing Platform," IEEE Trans. on Instr. and Meas., vol. 57, No. 11, Nov. 2008, pp. 2608-2615.

Raskar et al., "Photosensing Wireless Tags for Geometric Procedures," Sep. 2005, vol. 48, No. 9, pp. 46-51.

Smith et al., "RFID-Based Techniques for Human-Activity Detection," Sep. 2005, vol. 48, No. 9, pp. 39-44.

Borriello, "RFID: Tagging the World," Sep. 2005, vol. 48, No. 9, pp. 34-37.

* cited by examiner

RFID-BASED CORROSION AND MOISTURE DETECTION

CROSS-REFERENCE TO RELATED APPLICATIONS

This application is related the following co-pending and commonly-assigned U.S. utility patent applications, which are all incorporated by reference herein:

U.S. patent application Ser. No. 11/941,307, by Fay et al. filed Nov. 16, 2007, and entitled "FRACTURE DETECTING STRUCTURAL HEALTH SENSOR";

U.S. patent application Ser. No. 11/941,367, by Fay et al. filed Nov. 16, 2007, and entitled "CORROSION DETECTING STRUCTURAL HEALTH SENSOR"; and U.S. patent application Ser. No. 12/202,883, by Fay et al. filed Sep. 2, 2008, and entitled "HYBRID RESILIENT AND FRANGIBLE LAYERED STRUCTURAL HEALTH SENSOR".

BACKGROUND OF THE DISCLOSURE

1. Field of the Disclosure

This disclosure relates to structural testing. Particularly, this disclosure relates to techniques for monitoring the health of structural elements over time in service.

2. Description of the Related Art

The need to monitor the integrity of structural elements arises in many different applications. For example, it is necessary to monitor the structures of aircraft. The aircraft stay in service for many years and may experience environments that may exceed design limits resulting in different failure modes, e.g., fatigue, fracture, corrosion. Therefore, it is necessary to regularly check the structural integrity of the vehicle as part of any prudent maintenance program. Similarly, other types of structures may also require regular monitoring. Highway structures such as overpasses and bridges must be regularly checked. Some building structures may also require regular testing. Conventional testing techniques such as visual inspection, x-ray, dye penetrant, and electrical field techniques (e.g., eddy current testing, etc.) for testing structural elements have many drawbacks.

Visual inspection of structural members often requires some degree of disassembly of the structure. This adds greatly to the overall testing cost. Commercial aircraft must be regularly inspected for structural integrity. However, visual inspection of aircraft structures often requires substantial disassembly of structure and removal of installed equipment in order to provide the access needed to view the areas of interest at a distance adequate to detect corrosion visually. For example, regular visual inspections to detect the presence of corrosion of metallic floor structure in wet areas of aircraft, such as under lavatories, galleys, and entry doors can be burdensome. These time-consuming and costly inspections often reveal that the structure has no corrosion. Additionally, floor panel removal requires that factory seals are broken. Moreover, since there is a risk that the quality of the resealing may not be as high as the original factory seals, initial inspections may actually make the structure more susceptible to corrosion thereafter.

In one example, a micro-borescope has been proposed to inspect the structure from the cargo compartment, in an attempt to visually inspect the top surface of the floor beam upper chord while eliminating the requirement to remove structure. However, the micro-borescope technique requires time to visually inspect all of the surface of the floor beams. In addition, cargo liners must be removed to perform the inspection and trained inspectors must operate the equipment and interpret the images seen through the borescope. Furthermore, the probe of the micro-borescope may not be inserted where insufficient clearance exists and inserting the metal end of the borescope in between the floor structure and the floor panel may sometimes scratch the primer and corrosion inhibiting compound on the floor structure, making the structure susceptible to corrosion.

In another example inspection technique X-Ray testing, under the broader heading of radiographic testing, requires specialized facilities and government licenses. The technique employs the ability of short wavelength electromagnetic radiation to penetrate various materials. Either an X-ray machine or a radioactive source can be used as a source of photons. Because the amount of radiation emerging from the opposite side of an examined material can be detected and measured, variations in the intensity of radiation are used to determine thickness or composition of material and reveal any defects. Due to safety issues, X-ray testing also typically requires a complete work stoppage on all other tasks while the testing is being performed.

Dye penetrant testing is also time consuming and messy. Dye penetrant inspection is used to reveal surface breaking flaws through the bleedout of a colored or fluorescent dye from the flaw. The technique is based on the ability of a liquid to be drawn into a surface breaking flaw by capillary action. After a period of time, excess surface penetrant is removed and a developer is applied. This acts as a blotter. It draws the penetrant from the flaw to reveal its presence. The constituent penetrant and developer may and their by-products may be identified as hazardous (HAZMAT), requiring costly disposal means.

Finally, inspection methods using the application of electrical fields (e.g., eddy current testing, etc.) are exceptionally time consuming and difficult to read reliably in this type of application and may require alterations to structure. In typical eddy current testing for example, a circular coil carrying an AC current is placed in close proximity to an electrically conductive specimen to be tested. The alternating current in the coil yields a changing magnetic field, which interacts with the test object and induces eddy currents in it. Variations in the phase and magnitude of these eddy currents can be monitored using a second coil, or by measuring changes to the current flowing in the primary coil. The presence of any flaws or variations in the electrical conductivity or magnetic permeability of the test object, will cause a change in eddy current flow and a corresponding change in the phase and amplitude of the measured current. The technique is generally limited to detecting surface breaks or near surface cracking and variations in material composition.

Some newer technology has also been developed by Intel and the University of Washington. In this approach, RFID chips are augmented with sensing capability such as accelerometers. By incorporating two separate RFID chips on one platform (tag), the accelerometer acts as a switch and controls the communication. If the tag is affixed to an object and continuously interrogated, motion of the object can be inferred by the varying RFID response. However, none of this related technology is directed to environmental structural sensing on aircraft, and are not capable of sensing failures over extended areas on the aircraft. There is a need for a simplified RFID-sensing approach that can be uniquely applied to the aircraft. See, e.g., Greene, K., "Sensors Without Batteries," Technology Review published by MIT, http://www.technologyreview.com/, May 15, 2006; and "Design of an RFID-Based Battery-Free Programmable Sensing Platform"

IEEE Transactions on Instrumentation and Measurement, Vol. 57 No. 11, November 2008.

In view of the foregoing, there is a need in the art for apparatuses and methods for efficiently monitoring the integrity of structural elements. In particular, there is a need for such apparatuses and methods to monitor structural elements without requiring time-consuming disassembly. There is also a need for such apparatuses and methods to be light weight and inexpensive to use. There is particularly a need for such apparatuses and methods in aircraft applications. These and other needs are met by the present disclosure as detailed hereafter.

SUMMARY OF THE DISCLOSURE

Structural health monitoring apparatuses and methods are disclosed. One or more structural health sensors may be used to disconnect and/or connect one or more RFID chips to an antenna such that wireless communication with the one or more RFID chips (or the absence of wireless communication) through the antenna indicates the structural health status. Example structural health sensors may be moisture detecting or fracture detecting. A remote reader may be used to establish the wireless communication with the one or more RFID chips to determine the structural health. The sensors and RFID chips may be passive and powered through the wireless communication from the remote reader. Such apparatuses and methods may be applied to any large structures requiring regular inspection, such as aircraft, ships, automobiles, or buildings.

A typical apparatus embodiment of the disclosure for structural health sensing, comprises an antenna for wireless communication, a first RFID chip coupled to the antenna for establishing the wireless communication through the antenna, and a structural health sensor coupled between the antenna and the first RFID chip. The structural health sensor includes a switch for disconnecting the antenna in response to a structural problem indicator and disconnecting the antenna with the switch in response the structural problem indicator prevents a response signal from the first RFID chip. In some embodiments, the structural problem indicator may be moisture or a structural fracture for triggering an applicable structural health sensor. In addition, the structural health sensor may comprise a plurality of switches for disconnecting the antenna in response to the structural problem indicator. In one exemplary embodiment, the antenna may comprise a two-wire line and the switch may comprise a soluble shield enclosing the two-wire line. In this case, the two-wire line has a differential compression load between wires of the two-wire line and the structural problem indicator is moisture to dissolve the soluble shield to induce an electrical short between the wires.

In further embodiments of the disclosure, a remote reader may be used to establish the wireless communication with the first RFID chip through the connected antenna and the antenna disconnected in response the structural problem indicator prevents the response signal through the wireless communication to the remote reader. Typically, the structural health sensor and first RFID chip are passive and powered through the wireless communication from the remote reader. Establishing the wireless communication with the first RFID chip through the antenna connected may comprise the remote reader transmitting a query to the first RFID chip and receiving the response signal from the first RFID chip through the antenna. Disconnecting the antenna from the structural problem indicator typically prevents the response signal through the wireless communication to the reader by preventing establishing the wireless communication from the reader to the first RFID chip.

In still further embodiments of the disclosure, the apparatus may also include a second RFID chip, wherein the structural problem indicator toggles disconnecting the first RFID switch from the antenna and connecting the second RFID chip to the antenna. A remote reader may be used to establish the wireless communication with the first RFID chip through the antenna connected to the first RFID chip before the structural problem indicator to receive the response signal and establish the wireless communication with the second RFID chip through the antenna connected to the second RFID after the structural problem indicator to receive a different response signal. Typically, the structural health sensor and first RFID chip and the second RFID chip are passive and powered through the wireless communication from the remote reader.

In a similar manner, a typical method for structural health sensing, comprises the steps of establishing wireless communication through an antenna with a first RFID chip coupled to the antenna, transmitting a response signal from the first RFID chip through the antenna to indicate structural health, and disconnecting the antenna with a structural health sensor including a switch operating in response to a structural problem indicator. Disconnecting the antenna in response the structural problem indicator prevents transmitting the response signal from the first RFID chip through the antenna. Method embodiments of the disclosure may be further modified consistent with the apparatus embodiments described herein.

Embodiments of the disclosure may also encompass an apparatus for structural health sensing, comprising a first communication means capable of establishing wireless communication through an antenna and transmitting a response signal through the antenna to indicate structural health, and a switching means capable of disconnecting the antenna operating in response to a structural problem indicator. Disconnecting the antenna in response the structural problem indicator prevents transmitting the response signal through the antenna. A second communication means may also be used capable of establishing wireless communication through the antenna and transmitting a different response signal through the antenna wherein switching means toggles disconnecting the first communication means from the antenna and connecting the second communication means to the antenna in response to the structural problem indicator. These embodiments of the disclosure may also be further modified consistent with the other apparatus and method embodiments described herein.

The features, functions, and advantages that have been discussed can be achieved independently in various embodiments of the present disclosure or may be combined in yet other embodiments further details of which can be seen with reference to the following description and drawings.

BRIEF DESCRIPTION OF THE DRAWINGS

Referring now to the drawings in which like reference numbers represent corresponding parts throughout.

DETAILED DESCRIPTION OF THE PREFERRED EMBODIMENT

1. Overview

Figure 1A:
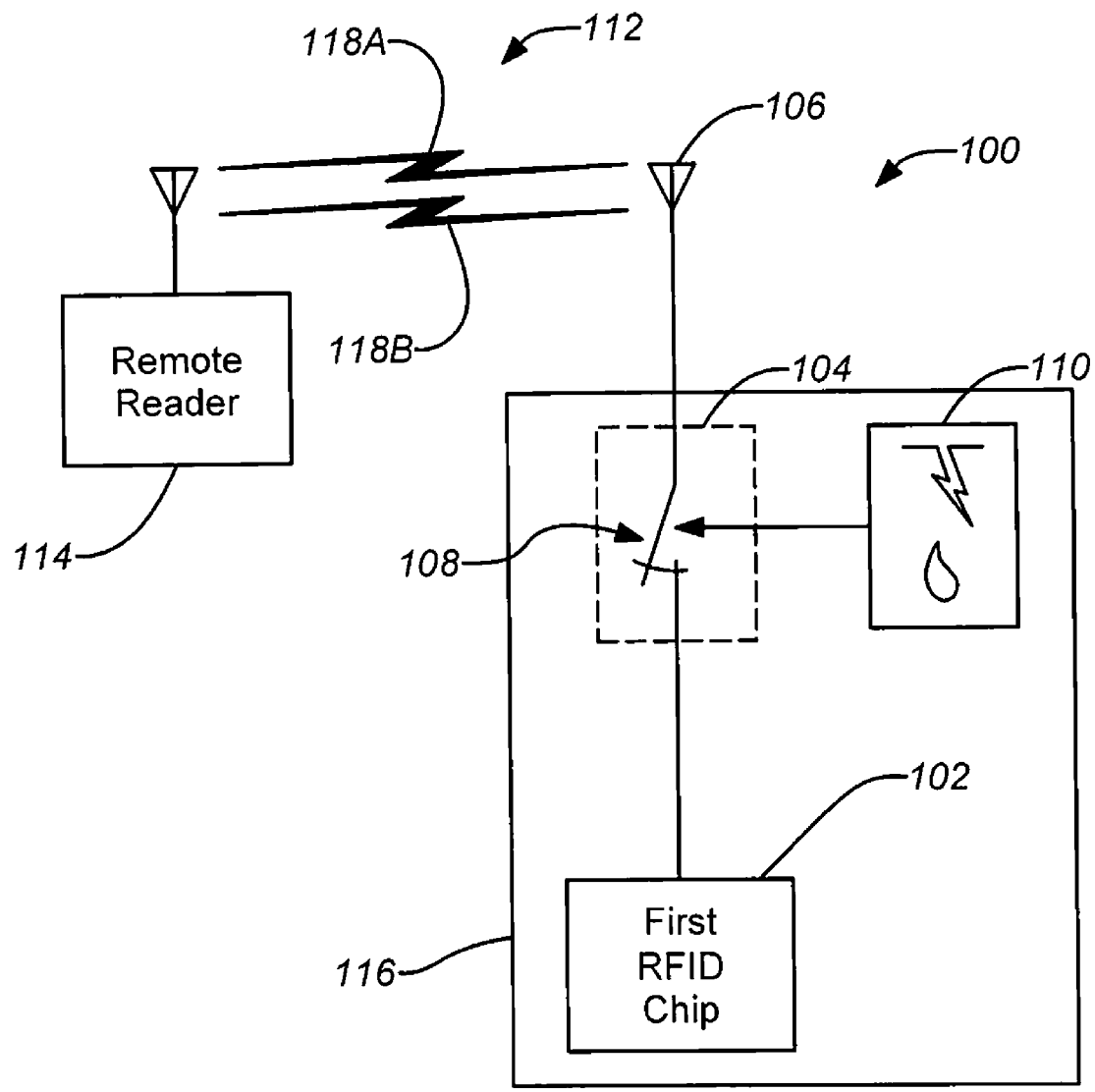
FIG. 1A is a schematic diagram of an exemplary embodiment for structural health sensing employing a single RFID chip.

Embodiments of the disclosure can automatically detect the presence of an environment conducive to corrosion, which can enable the replacement of time-consuming visual inspection procedures with a much simpler and quicker non-intrusive inspection. Embodiments of the disclosure can take advantage of known radio frequency identification (RFID) technology to yield a passive and wireless interface for a sensor system. Such a system can be particularly useful in corrosion monitoring of aircraft, although embodiments of the disclosure are not limited to such applications. In some embodiments of the disclosure, conventional RFID technology can be applied to create a binary detector, capable of sensing moisture. The RFID-based corrosion and moisture detection techniques herein may be more generally described as RFID-based environmental structural sensing techniques.

Embodiments of the disclosure can enable inspections which do not require direct access to the structure. Using embodiments of the disclosure, periodic visual inspections will no longer be required, thereby reducing time for disassembly and reassembly. These periodic inspections can be replaced with wireless inspections performed by a technician using a handheld scanner on short scheduled intervals (e.g., between flights). Thus, embodiments of the disclosure can enable inspections that can be performed rapidly with one person walking through the airplane with a handheld reader. The sensing technique is nonintrusive so the risk of damaging components during inspection is eliminated. Also, by varying the spacing of the sensors, almost any desired sensing resolution can be achieved. In addition, the sensors may be passive, not requiring a wired power source or battery. Another advantage of this system is that it does not require x-rays or other harmful radiation to function. The sensors may be powered wirelessly by the handheld reader. The sensors may not interfere with the existing form, fit, and function of the structure.

While other conventional corrosion sensors are commercially available, none are compatible with the example embodiment of the disclosure employed between structural surfaces. Existing corrosion sensors are not designed to the appropriate form factor to detect moisture or corrosion between the faying surfaces of an aircraft floor beam and floor panel. However, conventional corrosion sensors, as well as other types of structural sensor, may be implemented in other embodiments of the disclosure as will be understood by those skilled in the art. Although many embodiments described herein are directed to corrosion sensing in a structural joint, embodiments of the disclosure are not limited to corrosion sensing between faying surfaces of a structure. Furthermore, embodiments of the disclosure may be applied to any structure requiring regular inspections, e.g. aircraft, ships, automobiles, or buildings.

Embodiments of the disclosure employ structural health sensors uniquely adapted to operate with known passive wireless RFID technology as described hereafter. As used in the present application, a "structural health sensor" is a sensor that is disposed on a structural element and is triggered by the presence of a "structural problem indicator," a particular anomaly it detects according to its design that indicates there may be a problem that could negatively affect the structural element. Thus, the structural problem indicator may also be considered an event requiring structural inspection. Such sensors may be applied to any structural element, e.g. an aircraft bulkhead, or a bridge beam, to monitor its condition. The applicable structural problem indicator depends upon the particular type and design of the structural health sensor. For example, different types of structural health sensors may monitor for moisture or fractures. It should be noted that monitoring the "health" of a structure as used in the present application generally refers to employing any appropriate sensor for detecting any adverse condition (or the possibility of an adverse condition) of a structural element of interest.

Embodiments of the disclosure may be used with any sensor type having acceptable power requirements that can be incorporated into the described systems as will be appreciated by those skilled in the art. For example, sensors described in U.S. patent application Ser. No. 11/941,307, by Fay et al. filed Nov. 16, 2007, U.S. patent application Ser. No. 11/941,367, by Fay et al. filed Nov. 16, 2007, and U.S. patent application Ser. No. 12/202,883, by Fay et al. filed Sep. 2, 2008, which are all incorporated by reference herein, may be employed in embodiments of the present disclosure.

2. RFID Chips in a Structural Health Sensor System

FIG. 1A is a schematic diagram of an exemplary embodiment for structural health sensing employing a single RFID chip 102. The structural health sensing system 100 employs a first RFID chip 102 that is coupled to an antenna 106 through a structural health sensor 104. (Note that the RFID chip 102 is referenced as "first" in relation to further embodiments described hereafter employing more that one RFID chips.) The structural health sensor 104 includes a switch 108 capable of disconnecting the antenna 106 from the RFID chip 102 in response to a structural problem indicator 110. The applicable structural problem indicator 110 depends upon the particular type and design of the structural health sensor 104 which monitors the nearby structure 116. In one notable example, the structural health sensor 104 is designed to detect and respond to the presence of moisture. Thus, moisture is the structural problem indicator 110 for this example structural health sensor 104. (In another example, the structure health sensor 104 may be fracture detecting with a structural fracture as the structural problem indicator 110.)

As previously noted, although the application describes specific example sensor for detecting the possibility of corrosion, indicated by an unusual presence of moisture, embodiments of the invention are not limited to moisture or corrosion detection. For example, sensors that may detect structural fractures may also be implemented as previously mentioned. In addition, any other suitable sensor for detecting anomalies in a structure having acceptable power requirements and switching functionality for RFID implementation may be employed as well, as will be appreciated by those skilled in the art. The sensor can comprise any type of switching of the electrical circuit, e.g. to either break causing an open circuit or collapse onto itself causing a short circuit, with the signal change from RFID chip appropriately interpreted. For example, temperature could be used to cause the transmission line to melt and break causing an open circuit. Alternately, high magnitude electrical current (e.g., from lightening) or RF threat from a high energy source could cause the transmission line (switch) to melt in a similar manner. In another example, the switch may be designed to employ a chemical agent to cause a trigger in the switch.

In any case, monitoring of the structural health sensor 104 is performed through wireless communication 112. One important feature is the use of conventional RFID technology which employs passive electronics in the RFID chip 102. As is known in the art, the RFID chip 102 operates requiring minimal power which it receives through the wireless communication 112 link from the remote reader 114. The structural health sensor 104 employed in the system is similarly designed as a passive device that either requires no power or minimal power derived through the same wireless communication 112 link from the remote reader 114.

The remote reader 108 establishes the wireless communication 112 with the first RFID chip 102 through the antenna 106 when it is connected through the switch 108 of the sensor 104. Wireless communication 112 is typically established by the remote reader 114 first transmitting a query signal 118A to the RFID chip 102 through the antenna 106 and then receiving a response signal 118B from the RFID chip 102 through the antenna 106. In the system 100 of FIG. 1A, monitoring the structural health is possible because disconnecting the antenna 106 in response the structural problem indicator 110 prevents the response signal 118B from the first RFID chip 102 from being transmitted. Thus, receiving the response signal 118B at the remote reader 114 indicates structural health, but the remote reader 114 infers the presence of the structural problem indicator 110 from the absence of the response signal 118B after sending the query signal 118A.

As described in the example of FIG. 1A, a single sensor and RFID chip can be integrated with the antenna of the tag to create a binary state transponder. This implementation operates in a manner similar to RFID chips used in electronic article surveillance for consumer product theft prevention. The sensor is integrated into a portion of the antenna. In a healthy state the sensor is benign, leaving the connection to the antenna uncompromised and properly matched with the RFID chip. Thus, a query from a remote reader will be received and the RFID chip will properly respond. In the presence of corrosion or moisture, however, the sensor will degrade and may eventually break the conductive path causing a mismatch between the antenna and RFID chip. Such a mismatch will prevent communication between the reader and the RFID chip. Thus, moisture or corrosion is indicated by the lack of a response at the remote reader.

System 100 of FIG. 1A provides a significant improvement over the existing visual inspection method as it stands. The principle of this basic system 100 can be evolved to a higher sophistication level. One enhancement can be achieved by combining two RFID chips in one inlay with the sensor acting as a single pole double throw (SPDT) switch described hereafter.

Figure 1B:
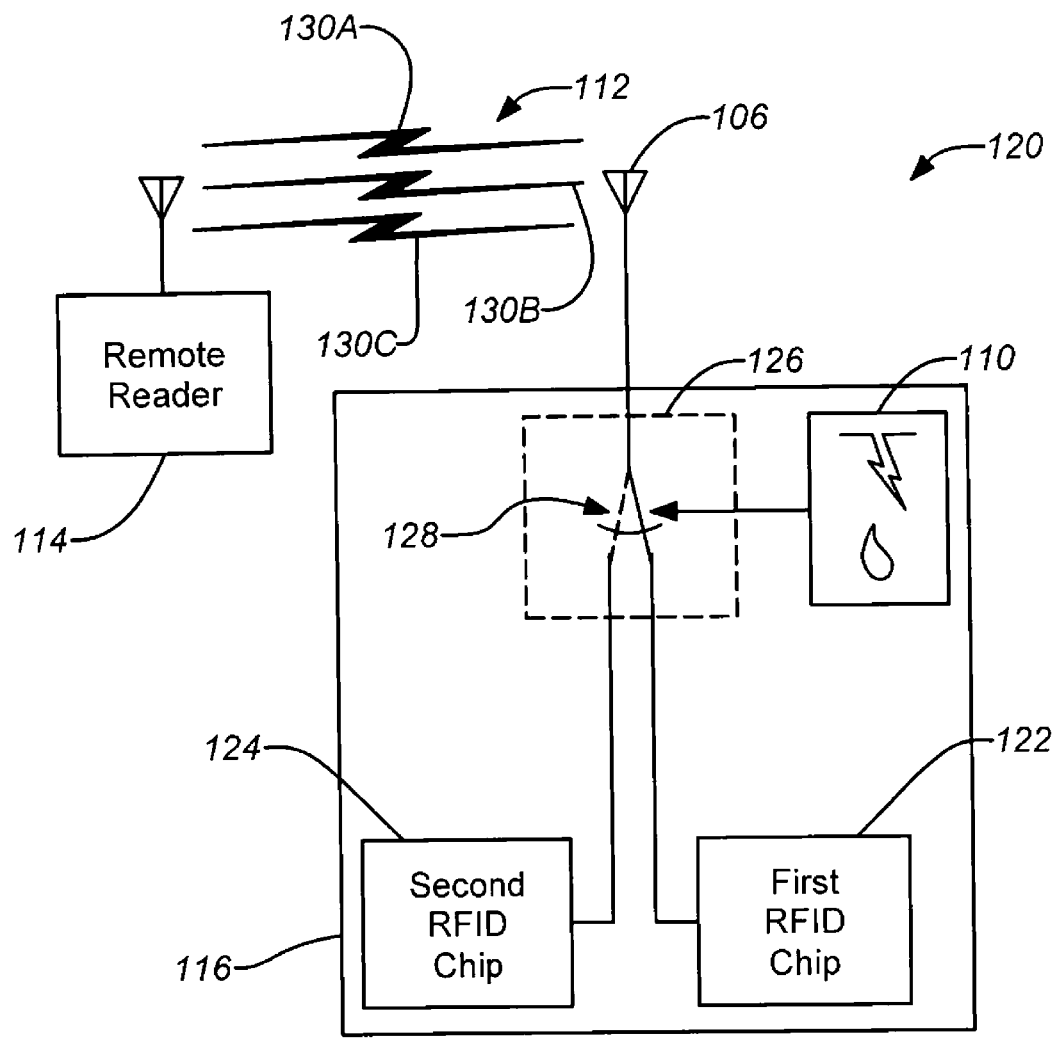
FIG. 1B is a schematic diagram of an exemplary embodiment for structural health sensing employing two RFID chips.

FIG. 1B is a schematic diagram of an exemplary embodiment for structural health sensing employing two RFID chips. Generally, the elements of this system 120 function in the same manner as the system 100 of FIG. 1A except where noted. In this system 120, a first and a second RFID chip 122, 124 are used along with a structural health sensor 126 that includes a switch 128 that toggles the connection to the antenna 106 between the two RFID chips 122, 124 (i.e., functioning as a single pole double throw (SPDT) switch). the remote reader 114 establishes the wireless communication 112 with the first RFID chip 122 through the antenna 106 connected to the first RFID chip to receive the response signal 130B before the structural problem indicator 110 occurs (in response to the query signal 130A from the remote reader 114). However, after the structural problem indicator 110 has triggered the switch 128, the antenna 106 is toggled to disconnect the first RFID chip 122 and connect the second RFID chip 124 to the antenna. Thus, the remote reader 114 establishes the wireless communication 112 with the second RFID chip 124 through the antenna 106 connected to the second RFID 124 after the structural problem indicator 110 to receive a different response signal 130C. Just as before, the first RFID chip 122 and the second RFID chip 124 (along with the structural health sensor 126) may be passive and powered through the wireless communication from the remote reader 114 using known RFID technology.

As described, the switch 128 of the system 120 is integrated into the sensor 126, which is coupled with the antenna 106. The sensor 126 may be designed to react in the presence of moisture (or other structural anomaly) and function as a single-event switch once moisture is detected. Once the moisture comes in contact with the sensor 126, the switch 128 toggles the first RFID chip 122 out of the antenna 106 path while toggling the second RFID chip into the antenna 106 path. Unlike the single RFID chip system 100 described previously, the two RFID chip system 120 provides an extra level of assurance that the tag is working properly. This is because the remote reader 114 receives an affirmative signal 130C from the second RFID chip 124, rather than simply inferring the sensor result from the absence of a response signal 118B as with the first system 100.

3. Exemplary RFID Structural Health Sensor Systems

Figure 2A:
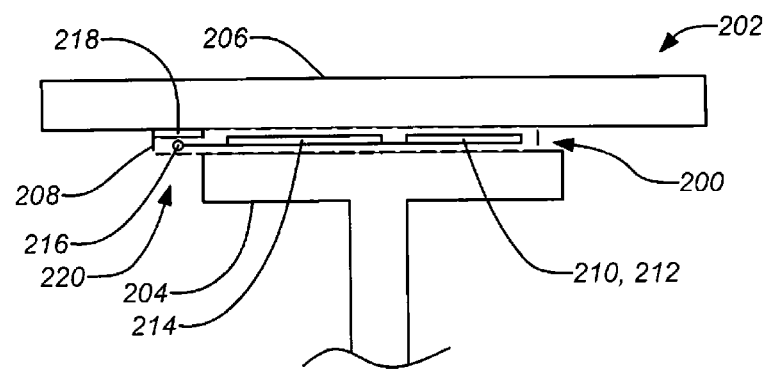
FIGS. 2A & 2B illustrate an exemplary structural health sensor disposed between a metal beam and panel in a structure.
Figure 2B:
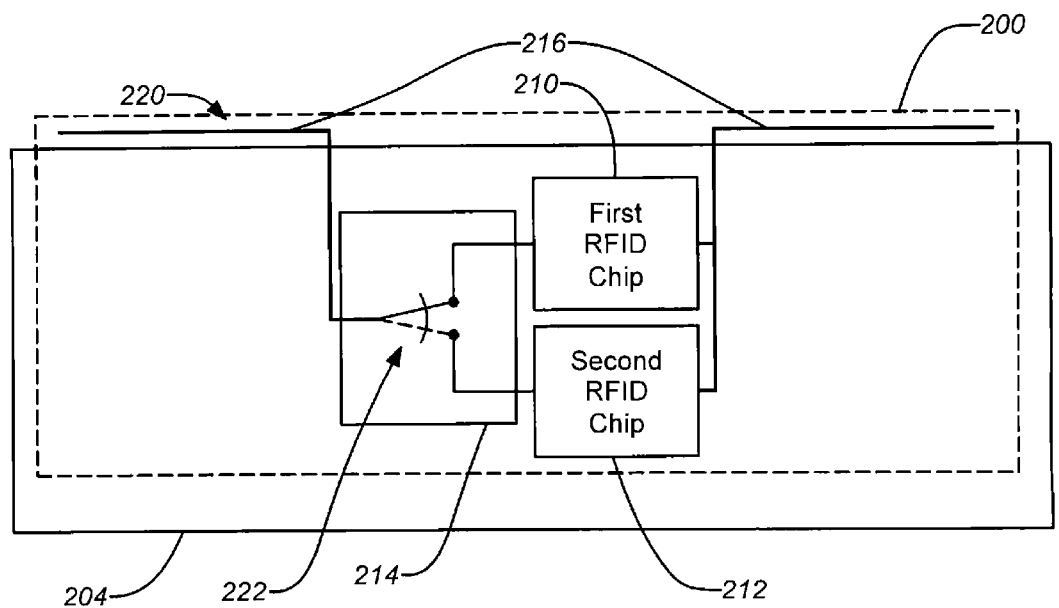

FIGS. 2A & 2B illustrate an exemplary structural health sensor device 200 disposed between a metal beam 204 and panel 206 in a structure 202. FIG. 2A illustrates a side view cross section of the structure 202 showing the sensor device 200. The sensor device 200 comprises one or more nonconductive membrane layers 208 including one or more RFID chips 210, 212, a structural health sensor 214 and antenna 216 and may be disposed in the bolted joint between the beam 204 and panel 206. In some embodiments, the entire sensor device 200 may be incorporated into an RFID tag for ready installation during manufacture of the structure 202.

FIG. 2B illustrates a top view cross section through the sensor 200. In this example, the antenna 216 comprises a two-wire antenna. However, it should be noted that only one of the leads of the two-wire antenna needs to be routed through the structural health sensor for operation of the sensor device 200. The other wire is couple to both the RFID chips 210, 212 as shown. Due to the surrounding metal structural elements, in order to facilitate establishing wireless communication with the remote reader (not shown), the antenna 216 is disposed within a region 220 of the sensor device 200 that is outside of the mechanical joint of the structure 202. In addition, a dielectric material layer 218 may be disposed between the antenna 216 and the metal panel 206 above as shown in FIG. 2A. The sensor device 200 operates in essentially the same manner as the system 120 described in FIG. 1B using structural health sensor 214 that toggle switch 222 between the two RFID chips 210, 212 in response to a structural problem indicator (e.g., moisture or a fracture). Alternately, one RFID chip can be eliminated to implement the system 100 of FIG. 1A in a similar manner, as will be understood by those skilled in the art.

Figure 3A:
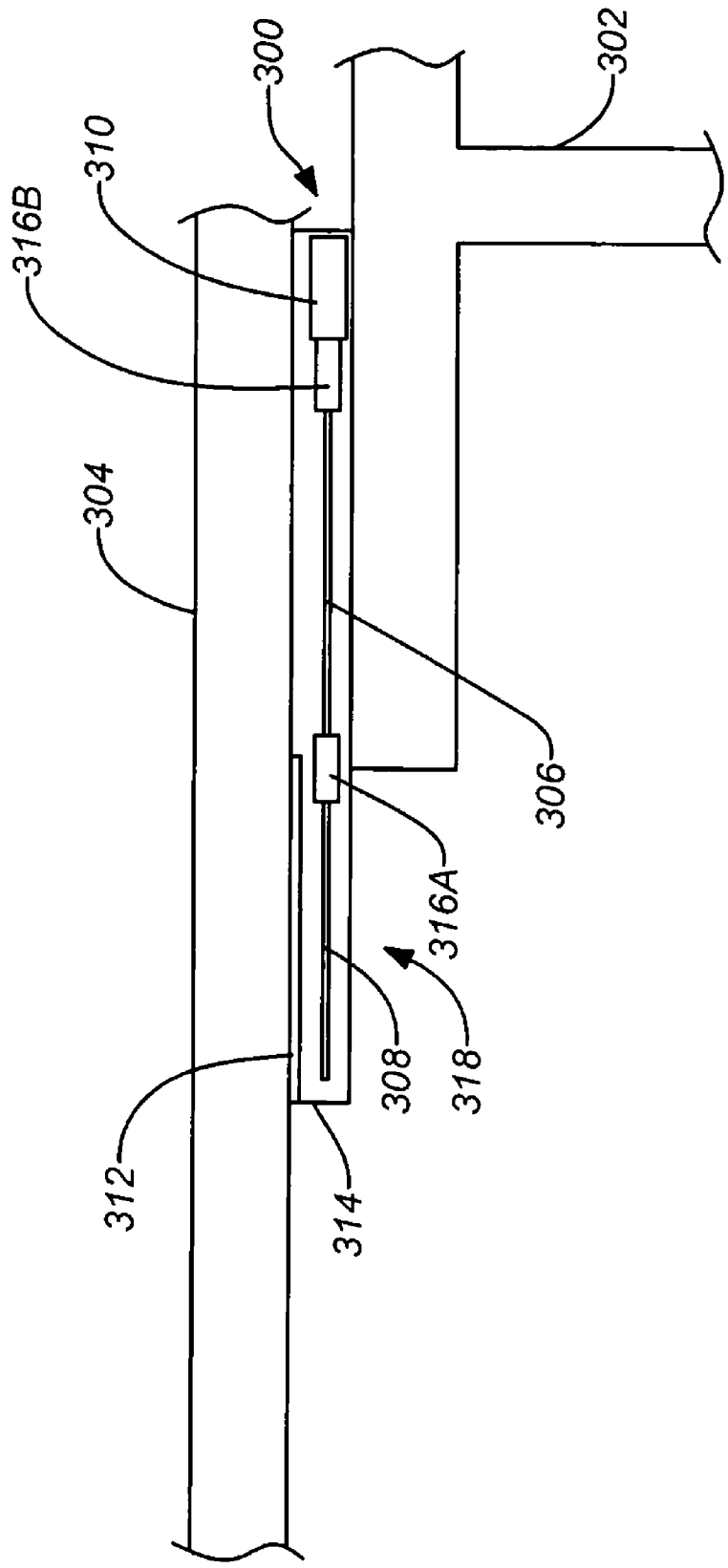
FIG. 3A illustrates a second exemplary structural health sensor device for moisture sensing.

FIG. 3A illustrates a second exemplary structural health sensor 300 for corrosion sensing. This sensor device 300 is shown in a mechanical joint between a metal beam 302 and a metal panel 304 similar to the sensor device 200 of FIGS. 2A & 2B. However, in this case, the sensor device 300 comprises a nonconductive membrane layer 314 employing a particular structural health sensor 306 comprising a differential transmission line for moisture detection over an expanded region which increasing the likelihood that moisture anywhere present in the mechanical joint will be detected. The antenna 308 (e.g., a two-wire antenna) is disposed in a region 318 outside the mechanical joint and is coupled to the structural health sensor 306 which is in turn coupled to an RFID chip 310. A dielectric material layer 312 (having a quarter wavelength thickness, e.g. for 2.4 GHz) for the antenna 308 may be used to prevent any interference from the conductive panel 304. In this example sensor device 300, matching sections 316A, 316B are used to couple the differential transmission line structural health sensor 306 to both the RFID chip 310 at one end and the antenna 308 at the other. As is known in the art, a traditional RFID tag has a chip and antenna that each exhibit a characteristic impedance. In order to communicate through the antenna 308, the RFID chip 310 must be impedance matched to the antenna 308 so that signal reflections at the interface are minimized. Introducing a transmission line or switch, causes the impedance to change. Therefore, impedance matching elements should be introduced at the interfaces to optimize performance.

Figure 3B:
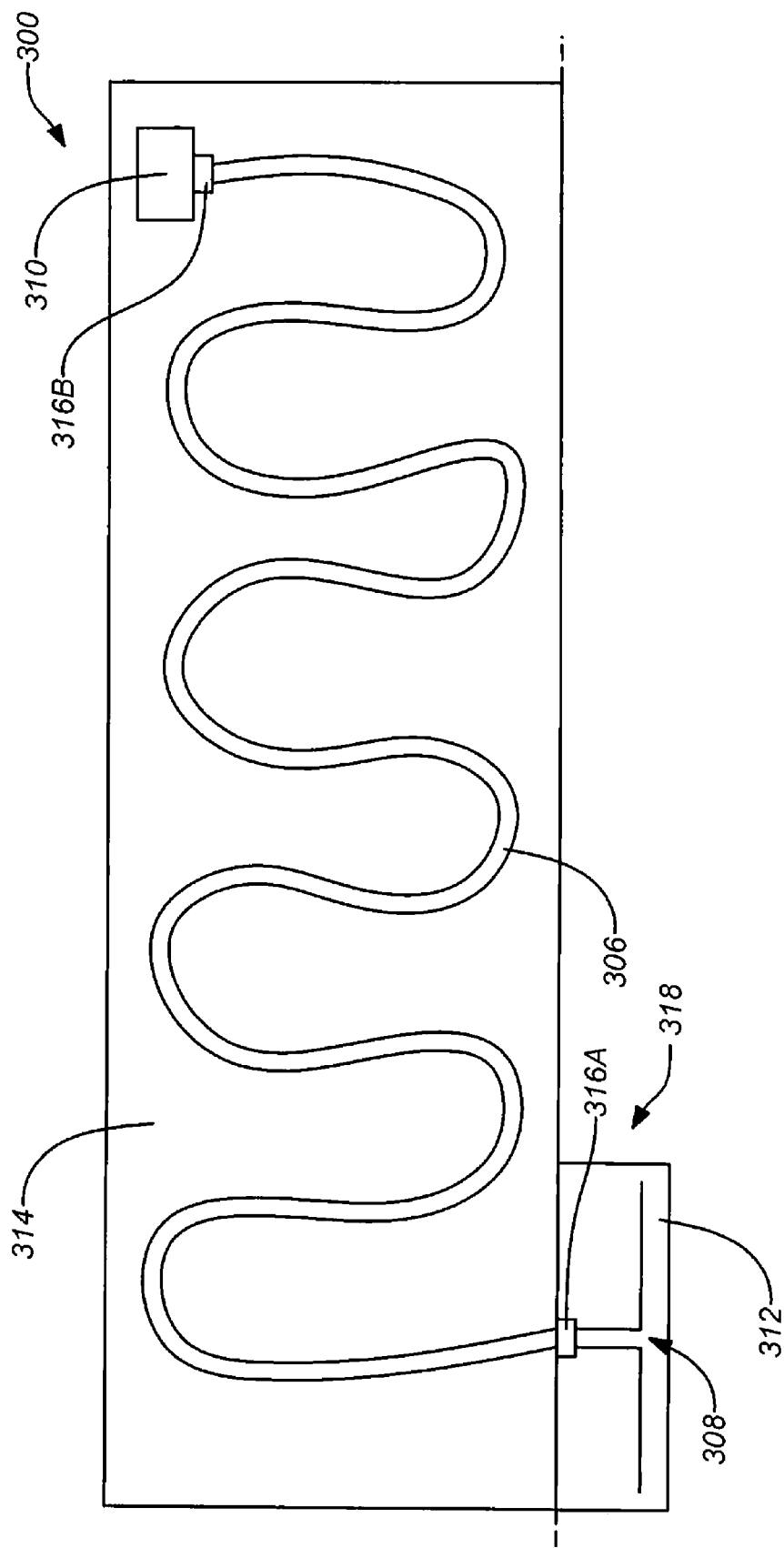
FIG. 3B illustrates a top view of the second exemplary structural health sensor for moisture sensing.

FIG. 3B illustrates a top view of the second exemplary structural health sensor device 300 for corrosion sensing. The matched antenna 308 and transmission line structural health sensor 306 enables communication and power to the RFID chip 310 from a remote reader (not shown). In addition, weep holes in the membrane layer 314 can be used allow moisture to enter and make contact with the transmission line structural health sensor 304. The novel transmission line structural health sensor 304 incorporates the switching function along its entire length as described in FIG. 3C. Accordingly, the transmission line structural health sensor 306 is routed along a path (e.g., a meanderline) within the membrane layer to any area desired to be monitored for moisture. Thus, the transmission line structural health sensor 306 comprises a plurality of switches for disconnecting the antenna effectively in parallel connection along the length of the transmission line.

Figure 3C:
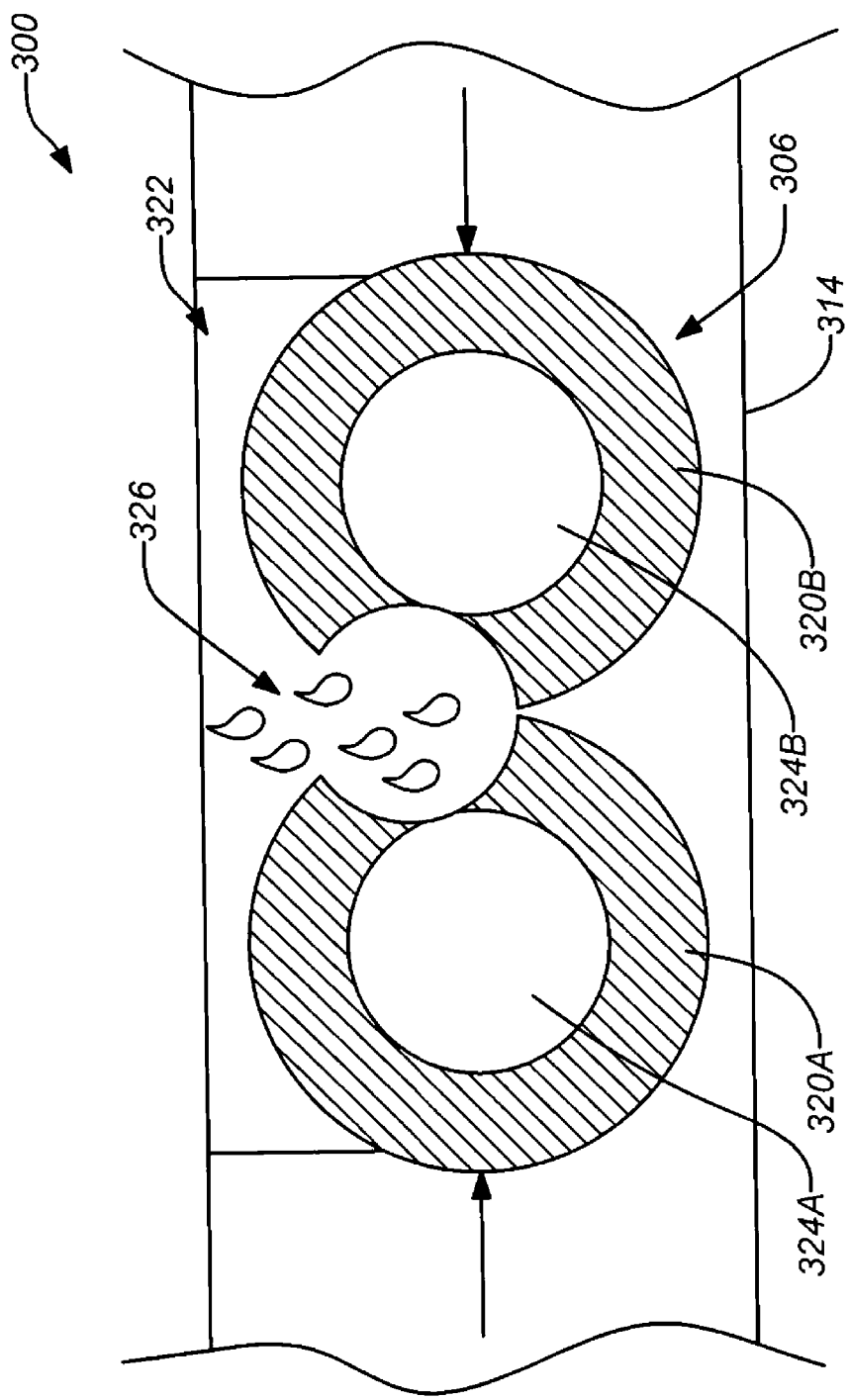
FIG. 3C illustrate the two-wire moisture sensor and switch mechanism in the second exemplary embodiment.

FIG. 3C illustrate the two-wire moisture sensor and switch mechanism in the second exemplary embodiment. The transmission line structural health sensor 306 comprises a two-wire line having a soluble shield 320A, 320B around each of the wires 324A, 324B at multiple locations along its length within the layer 314. In one example, the soluble shield 320A, 320B may be constructed from a polyvinyl alcohol (PVA) water soluble film or any other suitable water soluble material. The presence of moisture 326 (e.g. contacting the sensor 304 through weep hole 322) dissolves the shield 320A, 320B bringing two conductive wires 324A, 324B of the sensor 306 in contact in a short circuit, terminating communication with the RFID chip. The wires 324A, 324B should be loaded in compression (indicated by the arrows) to facilitate ready contact between the wires 324A, 324B as the shields 320A, 320B dissolve. Although it is preferable that the wires 324A, 324B contact each other causing a short, small impedance changes should also be detectable in the presence of moisture 326 before fully shorting.

As has been described above, sensing devices in accordance with the present disclosure comprise an antenna, one or more RFID chips, sensing components including a switch, and packaging. These elements may be combined on an inlay similar to existing RFID tags. The wireless interface is based on RFID technology, which is a reliable and affordable commodity. There are numerous vendors and designs of RFID chips, antennas, and tag inlays. For the above example, an augmented version of a typical RFID tag may be implemented to yield a system that can detect the presence of moisture or corrosion. The tags may be produced in variable shapes and lengths providing flexibility of installation.

Any of the described devices and systems for structural health sensing can be further enhanced by varying the quantity, location, type and function of sensors on the RFID tag. For instance, adding another sensor on the opposite side of the RFID tag in the system 200 of FIG. 2B would increase the probability of detection since a larger area would be sampled. Ideally, a sensor may span the entire area of the tag area so that the switch can toggle if moisture is encountered at any location on the tag. In some embodiments, different sensor types may also coexist on the same tag. For instance, a single tag may have combined moisture and corrosion detection capability by combining sensors/switches and RFID chips in different configurations. See e.g., U.S. patent application Ser. No. 11/941,367, by Fay et al., filed Nov. 16, 2007, and U.S. patent application Ser. No. 12/202,883, by Fay et al., filed Sep. 2, 2008.

Further, embodiments of the disclosure are not limited to moisture or corrosion detection, but could include the detection of other structural problem conditions, such as fractures. For example, a sensor could be designed to physically break in the presence of a crack acting as a simple switch. The form factor of the tag can vary significantly to allow for sensing in areas other than faying surfaces. For example, the tag may be integrated with washers or other fastening elements if detection around fastener holes was desired. This design would work in conjunction with others providing a comprehensive sensing capability. See e.g., U.S. patent application Ser. No. 11/941,307, by Fay et al., filed Nov. 16, 2007.

4. Method of Monitoring Structural Integrity

Figure 4:
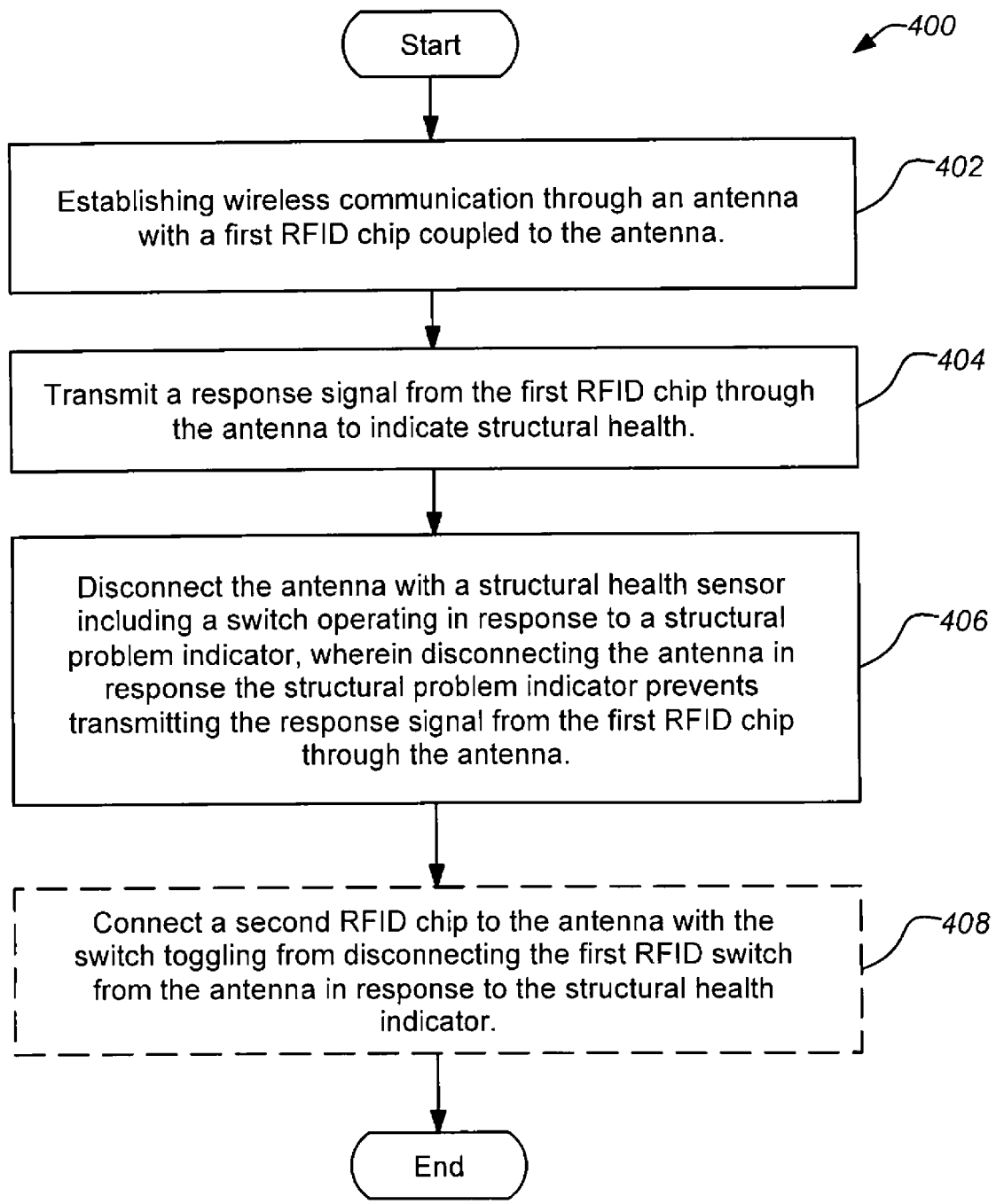
FIG. 4 is a flowchart of a method 400 of sensing a structural health sensing.

FIG. 4 is a flowchart of a method 400 of structural health sensing. The method 400 begins with a first operation 402 of establishing wireless communication through an antenna with a first RFID chip coupled to the antenna. Next in operation 404, a response signal is transmitted from the first RFID chip through the antenna to indicate structural health. Finally in operation 406, the antenna is disconnected from the first RFID chip with a structural health sensor including a switch operating in response to a structural problem indicator, where disconnecting the antenna in response the structural problem indicator prevents transmitting the response signal from the first RFID chip through the antenna. This method 400 for structural health sensing may be modified consistent with any of the devices or other methods described herein.

In one example, the method 400 may be modified with the additional optional operation 408 of connecting a second RFID chip to the antenna with the switch toggling from disconnecting the first RFID switch from the antenna in response to the structural health indicator. In addition, establishing the wireless communication may be performed with a remote reader through the antenna to the first RFID chip or the second RFID chip depending upon the connected state of the antenna as described.

An
installation process along with a data management and prognosis system may also be employed with embodiments of the disclosure. At the time of the installation, the location of the RFID sensor tag on the structure (e.g. an airframe) may be recorded and stored in a maintenance system database. Each of the RFID chips may have a unique ID written to it, one corresponding to a healthy state, and the other corresponding to the sensed structural problem indicator state (moisture, corrosion, etc). For example, in the system of FIGS. 2A & 2B, the first RFID chip may be registered in the database as the healthy state indicator, and a unique ID is written to it at the time of installation. The second RFID chip is registered in the same way, but indicating a structural problem. Once the tag is installed into the structure of interest, the second RFID chip remains "off" until moisture (or other appropriate structural problem, based on the sensor type) causes the sensor to toggle the switch from the first RFID chip to the second RFID chip. A similar procedure may also be used for any of the embodiments described herein.

During a typical inspection, a technician may access the tags through the cabin or cargo areas. Using a standard RFID reader with specialized software, the technician may scan the tags remotely. The specialized software may be used to report back which of the RFID tags it has communicated with and which of those indicate a structural problem. This software may also be designed to guide the technician through the inspection process showing an interactive map, highlighting the specific zones to be inspected. The completed inspection areas may be shown graphically as shadowed regions indicating the RFID tags for particular areas that have responded. The software may also employ an automated prognosis, which can reduce potential interpretation error on part of the technician, an automated way of detecting a failure that is an improvement over a visual inspection. If the mechanic missed the failure during a visual inspection, an embodiment of the present disclosure should catch it.

As detailed above, this disclosure enables a new technique for inspecting for corrosion and/or moisture (or other problems) in structures that are difficult to access and/or prone to corrosion, e.g. such as floor beam caps under lavatories or galleys in an aircraft structure. The integration of a moisture and/or corrosion sensor with the RFID chip allows embodiments of the disclosure to operate as a wireless sensor capable of indicating a possible structural problem. The described inspection technology may replace expensive conventional inspection methods which rely on disassembly and periodic visual inspection. This described inspection technique enables an inspection scheme in which structural disassembly is required only for areas where moisture ingression and or corrosion has been detected by the sensor system.

This concludes the description of various embodiments of the present disclosure. The foregoing description including the described embodiment of the disclosure has been presented for the purposes of illustration and description. It is not intended to be exhaustive or to limit embodiments of the disclosure to the precise forms disclosed. Many modifications and variations are possible within the scope of the foregoing teachings. Additional variations of the present disclosure may be devised without departing from the inventive concept as set forth in the following claims.

What is claimed is:

1. An apparatus for structural health sensing, comprising:
an antenna for wireless communication;
a first RFID chip coupled to the antenna for establishing the wireless communication through the antenna; and
a structural health sensor coupled between the antenna and the first RFID chip, the structural health sensor including a switch for disconnecting the antenna in response to a structural problem indicator;
wherein disconnecting the antenna with the switch in response the structural problem indicator prevents a response signal from the first RFID chip a second RFID chip, wherein the structural problem indicator toggles disconnecting the first RFID chip from the antenna and connecting the second RFID chip to the antenna; and
a remote reader establishes the wireless communication with the first RFID chip through the antenna connected to the first RFID chip before the structural problem indicator to receive the response signal and the remote reader establishes the wireless communication with the second RFID chip through the antenna connected to the second RFID after the structural problem indicator to receive a different response signal.

2. The apparatus of claim 1, wherein the structural problem indicator comprises moisture or a structural fracture.

3. The apparatus of claim 1, wherein the structural health sensor comprises a plurality of switches for disconnecting the antenna in response to the structural problem indicator.

4. The apparatus of claim 1, wherein the antenna comprises a two-wire line and the switch comprises a soluble shield enclosing the two-wire line, the two-wire line having a differential compression load between wires of the two-wire line and the structural problem indicator is moisture to dissolve the soluble shield to allow an electrical coupling between the wires.

5. The apparatus of claim 1, wherein the structural health sensor and first RFID chip and the second RFID chip are passive and powered through the wireless communication from the remote reader.

6. The apparatus of claim 1, wherein a remote reader establishes the wireless communication with the first RFID chip through the antenna connected and disconnecting the antenna from the structural problem indicator prevents the response signal through the wireless communication to the remote reader such that the structure problem indicator is inferred by the remote reader.

7. The apparatus of claim 6, wherein the structural health sensor and first RFID chip are passive and powered through the wireless communication from the remote reader.

8. A method for structural health sensing, comprising the steps of:
establishing wireless communication through an antenna with a first RFID chip coupled to the antenna;
transmitting a response signal from the first RFID chip through the antenna to indicate structural health;
disconnecting the antenna with a structural health sensor including a switch operating to disconnect the antenna in response to a structural problem indicator;
wherein disconnecting the antenna in response the structural problem indicator prevents transmitting the response signal from the first RFID chip through the antenna; and connecting a second RFID chip to the antenna with the switch toggling from disconnecting the first RFID chip from the antenna in response to the structural health indicator,
wherein establishing the wireless communication is performed with a remote reader to the first RFID chip through the antenna connected to the first RFID chip before the structural problem indicator to receive the response signal and establishing the wireless communication is performed with the remote reader to the second RFID chip through the antenna connected to the second RFID after the structural problem indicator to receive a different response signal.

9. The method of claim 8, wherein the structural problem indicator comprises moisture or a structural fracture.

10. The method of claim 8, wherein the structural health sensor includes a plurality of switches for disconnecting the antenna in response to the structural problem indicator.

11. The method of claim 8, wherein disconnecting the antenna comprises moisture as the structural problem indicator dissolving a soluble shield enclosing wires of a two-wire line to allow an electrical coupling between the wires of the two-wire line, the two-wire line having a differential compression load between the wires of the two-wire line.

12. The method of claim 8, wherein the structural health sensor and first RFID chip and the second RFID chip are passive and powered through the wireless communication from the remote reader.

13. The method of claim 8, wherein establishing the wireless communication is performed with a remote reader to the first RFID chip through the antenna connected and disconnecting the antenna from the structural problem indicator prevents the response signal through the wireless communication to the remote reader such that the structure problem indicator is inferred by the remote reader.

14. The method of claim 13, wherein the structural health sensor and first RFID chip are passive and powered through the wireless communication from the remote reader.

15. An apparatus for structural health sensing, comprising:

a first communication means capable of establishing wireless communication through an antenna and transmitting a response signal through the antenna to indicate structural health;

a switching means capable of disconnecting the antenna operating in response to a structural problem indicator;

wherein disconnecting the antenna in response the structural problem indicator prevents transmitting the response signal through the antenna and a second communication means capable of establishing wireless communication through the antenna and transmitting a different response signal through the antenna, wherein switching means toggles disconnecting the first communication means from the antenna and connecting the second communication means to the antenna in response to the structural problem indicator, wherein the switching means, first communication means, and second communication means are passive and powered through the wireless communication from a remote reader.

16. The apparatus of claim 15, wherein the switching means and first communication means are passive and powered through the wireless communication from a remote reader.

\* \* \* \* \*